United States Patent [19]

Engdahl

[11] 4,100,807
[45] Jul. 18, 1978

[54] PEAK-RECORDING ACCELEROMETER

[76] Inventor: Paul D. Engdahl, 2850 Monterey Ave., Costa Mesa, Calif. 92626

[21] Appl. No.: 805,325

[22] Filed: Jun. 10, 1977

[51] Int. Cl.² .............................................. G01P 15/04
[52] U.S. Cl. ............................... 73/492; 116/114 AH; 116/129 B
[58] Field of Search ........................ 73/492, 514, 515; 116/114 AH, 129 B, 136.5

[56] References Cited

U.S. PATENT DOCUMENTS

| 797,500 | 8/1905 | Cowey | 73/491 |
|---|---|---|---|
| 2,394,974 | 2/1946 | Bevins | 73/492 |
| 2,671,202 | 3/1954 | Petroff | 73/516 R X |
| 3,318,157 | 5/1967 | Browning et al. | 73/492 |

Primary Examiner—James J. Gill
Attorney, Agent, or Firm—Lawrence Fleming

[57] ABSTRACT

A low-cost accelerometer having auxiliary pointers which hold its peak readings. It is suitable as a portable instrument for vehicle testing, or may be installed in a structure to hold or retain the maximum readings that occurred during an earthquake or other shock. The accelerometer comprises a cantilever-reed-type mass-spring system with an indicating pointer disposed so as to push a pair of light-weight balanced "tell-tale" or holding pointers which are mounted on light frictional pivots and record or hold the peak deflection of the main pointer. The working parts are mounted in a flat case filled with a damping fluid. Reset knobs for the holding pointers are located on the outside of the case. The frictional torque of their pivots is adjustable from outside. A typical range for the instrument is ± 2 g.

8 Claims, 5 Drawing Figures

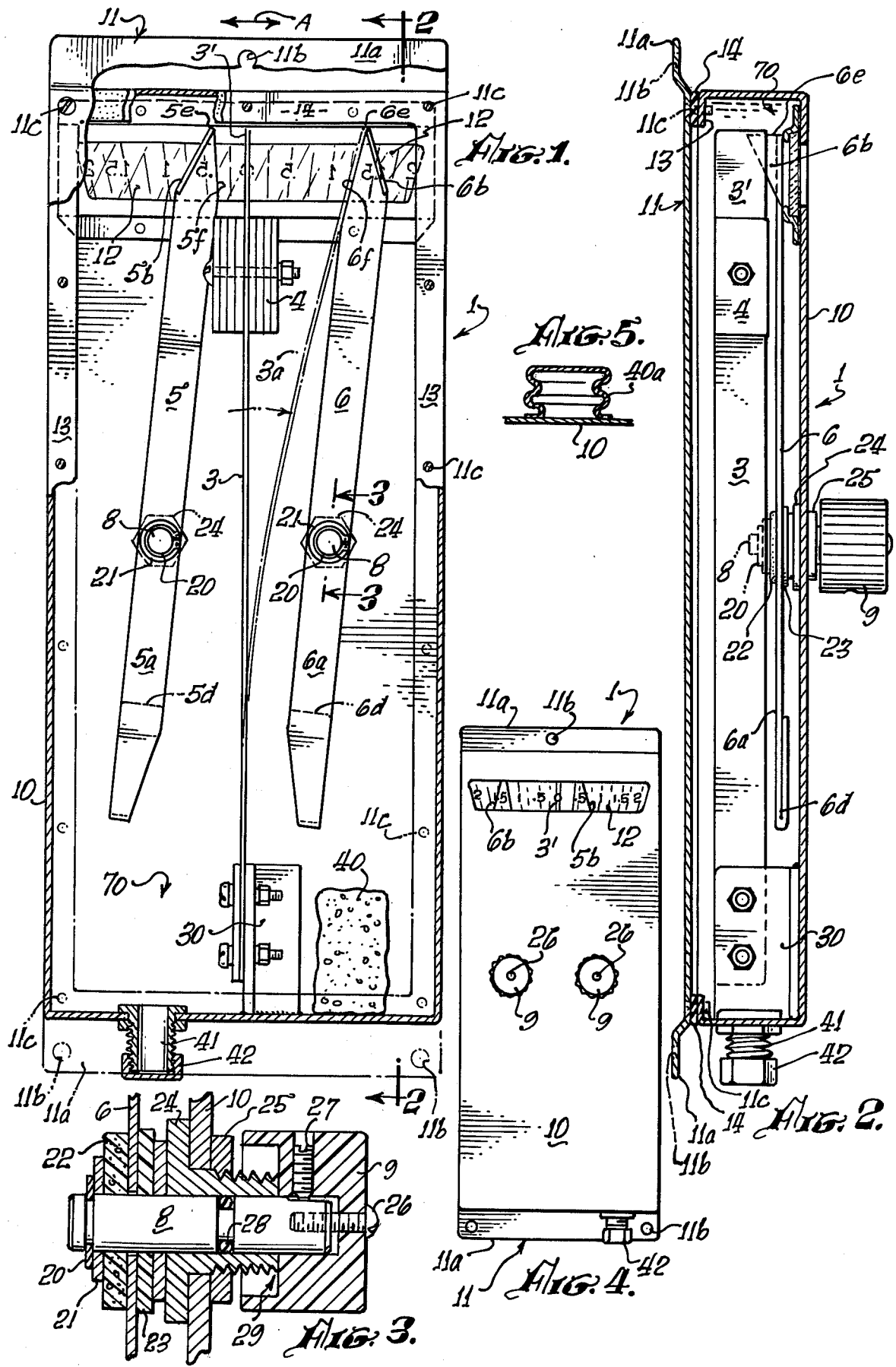

PEAK-RECORDING ACCELEROMETER

BACKGROUND

In testing forward acceleration, braking deceleration, and lateral cornering acceleration of automobiles and other vehicles, various instruments have been used which employ the familiar mass-spring principle with fluid damping. Such instruments have also been provided with auxiliary peak-holding pointers which are pushed ahead of the main acceleration-indicating pointer and remain at positions corresponding to the maximum or peak excursions along the scale until they are reset by the operator. Commonly two such holding pointers are provided in an instrument with a zero-center scale, to hold or "record" the peak acceleration experienced in either direction.

There are needs for improvement in the following respects: (a) balancing of the holding pointers, (b) adjustability from outside the case, (c) adaptability to mounting in various orientations, and (d) simplicity and economy of manufacture.

BRIEF SUMMARY

This invention is an indicating and peak-holding accelerometer suitable for portable use as in testing the performance of automobiles and other vehicles. It is also useful for showing the maximum acceleration that was reached in an earthquake or other mechanical shock; for this purpose it may be installed in a building. Since the instrument is inexpensive and requires no power or maintenance, a number of them may be installed economically in a building on different floors and in different orientations.

The term "peak-recording" is used here to refer to an analog indicating instrument having one or more auxiliary pointers which are pushed ahead of the actual indicating pointer and remain where they are pushed, so holding or storing the maximum readings. Such pointers are here termed "holding pointers".

In the present instrument, acceleration applied to the case is sensed by a mass-spring system of the cantilever reed type which carries a main indicating pointer, movable across a calibrated scale, at its free end. A typical full-scale range may be 2-0-2 g, with zero in the center. (One "g" is the acceleration of gravity.)

The reed is contained in a case of generally flat shape filled with a damping fluid such as oil. The pointer is visible through a window on which the acceleration scale is marked.

Adjacent the reed on either side are the holding pointers. These are preferably of light sheet metal. They are pivoted on short shafts which extend through the case to the outside. The rotary connection between each holding pointer and its shaft is of the frictional slip type; preferably each holding pointer has a hole which provides a loose running fit on the shaft, and is frictionally restrained from turning with respect to the shaft by suitable friction washers, between which it is pinched lightly. The pinching force is preferably provided by means of a light tension in the shaft. This tension is adjusted by screw means which may be located in the center of a reset knob on the outer end portion of the shaft, the knob action as an axial stop.

The shaft itself is sealed with an O-ring or other suitable means to keep the damping fluid from leaking out. The same sealing means may supply suitable rotary friction between the shaft and the case.

In use, the friction between holding-pointer and shaft is adjusted so that it prevents each pointer from moving by itself (when not pushed by the main pointer) when reasonable accelerations are applied to the case, but permits each holding pointer to be deflected by the main pointer with negligible loading error. To reset the instrument the knobs are turned manually to bring the holding pointers back against the main pointer, at midscale. All three pointers are visible back of the window.

The holding pointers have weighted tail portions which extend beyond their pivot points. These are proportioned to provide balancing so that linear accelerations applied to the case do not impart appreciable torque and hence to not tend to deflect the holding pointers directly.

In measuring linear acceleration and deceleration in, e.g., an automobile, the instrument is preferably oriented with the reed deflection and the scale in a horizontal plane, to eliminate errors which would be introduced by gravitational pull on a vertical reed. For accelerations less than about 1 g, the instrument may simply be laid down flat on the car seat.

The cover of the case is gasketed against leakage of the damping fluid. A volume-resilient element is preferably provided inside the case to serve as an expansion compensator. It may take the form of a body of cellular elastomeric material or a metallic bellows.

IN THE DRAWING

FIG. 1 is a bottom view of a complete accelerometer with the cover partly cut away;

FIG. 2 is a section on line 2—2 of FIG. 1;

FIG. 3 is an enlarged detail section of a holding pointer pivot structure;

FIG. 4 is a front view of a complete accelerometer; and

FIG. 5 is a detail section of an alternative form of expansion compensator.

DETAILED DESCRIPTION

FIG. 1 shows the interior of the accelerometer, which is indicated generally at 1, from the bottom, the bottom cover being removed. The mass-spring system which responds to acceleration is a resilient cantilever reed 3 anchored at its root end to the case 10 via a suitable bracket 30, and bearing a suitable weight or mass 4 near its free end. Its tip portion 3' serves as a pointer, movable along a transparent scale 12 and visible through it from the outside. The reed 3 is shown in side view in the section of FIG. 2. Bracket 30 is attached to the front wall of case 10. The cover 11, FIG. 2, is on the back and preferably attached to a rear flanged portion 13 of case 10 by screws 11c. A suitable gasket 14 is provided. Back cover 11 preferably has extended end portions 11a with mounting holes 11b, FIG. 2 and 4, for use where it is desired to fasten the instrument to a structure.

Case 10 is preferably made of sheet metal welded or soldered at the corners to be liquid-tight. It is preferably filled with a damping fluid, indicated at 70. The window 12, FIGS. 1, 2, and 4, which preferably carries the acceleration scale, is suitably cemented or gasketed to an opening in the case.

Shafts 8—8 for the holding pointers 5, 6, FIGS. 1-3, extend through suitable bushings 24 which pass through the front wall of case 10. The bushings 24 may be suitably sealed, and secured in place by nuts 25, FIG. 3. The shafts 8 are sealed against leakage of the damping fluid 70 as by suitable O-rings 28, FIG. 3.

Holding pointers

Referring still to FIGS. 1–3, the holding pointers 5,6 are frictionally pivoted to their respective shafts 8 and held thereon by suitable means such as retaining rings 20. Frictional means provided on each shaft 8 preferably comprise a metal washer 21, FIG. 3, a compressible washer 22, e.g., of felt, and a plastic washer 23 which may be of nylon or PTFE. Each holding pointer and washer assembly is held together against the inner face of bushing 24 by the external reset knob 9 which bears against the outer end of the bushing 24 at 29, FIG. 3.

To provide the required friction between a holding pointer 5 and 6 and its shaft 8, the shaft is pulled outward at a slight axial tension to compress the washers 22, 23, and maintained there by tightening a setscrew 27 in the knob 9. The degree of tension or pull on the shaft 8 is adjustable from outside the case by turning an adjusting screw 26 in the center of knob 9. Other known means than a set screw may be used to hold or clamp the knob 9 to shaft 8.

In a practical embodiment the requirement for the frictional "drag" torque of the holding pointers was determined as follows. A suitable mass at 4, FIGS. 1–2, is about 30 grams, which then supplies about 30 grams (about 0.29 newton) of force at 1 g acceleration. The deflection of the main pointer 3' will be reduced by the force required for it to push a holding pointer 5 or 6. It will be assumed that this deflection error should be no more than 0.02 g or 1 percent of full scale. The frictional "drag" at the tip of the holding pointer should hence be no more than $0.02 \times 30 = 0.6$ grams. The distance from the pivot point at shaft 8 to the tip of a holding pointer being about 8 cm, the frictional torque presented by the washers 22, 23 should be about $0.6 \times 8 = 4.8$ gm-cm. This value is readily attained with the construction shown.

The holding pointers 5, 6 are preferably made of light sheet metal such as aluminum about 0.5 mm thick. To balance out torques induced by linear acceleration, the tail portions at 5a, 6a, FIGS. 1–2, are suitably prolonged and weighted. The weighting may consist in merely folding back the tail portions as at 6d, FIGS. 1–2.

The head end portions of the holding pointers 5, 6 are preferably provided with turned-up bent portions 5b, 6b. These provide edges 5e, 6e extending into the plane of the main pointer tip 3', for the tip to engage and push against.

The adjacent edges of the holding pointers may preferably be cut at an angle as at 6f, FIG. 1, in order to lie about parallel to the calibration lines on the scale 12, FIG. 1.

These calibration lines or indices, FIGS. 1 and 4, are disposed parallel to the main pointer tip 3' throughout its travel, in known manner. The indices are approximately radii from an imaginary point about halfway down the reed 3, due to the manner in which the reed bends. Reed 6 is indicated in a deflected position at 6h, FIG. 1. The pivot points of the holding pointers at 8, 8 are accordingly located approximately in line with this equivalent pivot point of the reed.

The damping fluid 70 with which the case 10 is filled may be a known type of oil such as is used in compasses and aircraft instruments. A filler neck 41, FIG. 1, with a suitable cap 42 is provided to fill the case. To accommodate thermal expansion and contraction of the fluid, an expansion compensator 40 is mounted inside the case 10, FIG. 1. This is particularly desirable to take up the space which would otherwise be occupied by foam or bubbles upon contraction of the fluid, which may interfere with reading the scale 12.

One suitable form of compensator is a block of closed-cell elastomer such as an oil-resistant cellular rubber. Such a compensator is indicated at 40, FIG. 1. An alternative form is a sealed metallic bellows, as indicated at 40a in FIG. 5, fastened to the inside wall of case 10.

I claim:
1. A peak-recording accelerometer comprising:
   a sealable case having a transparent window and a calibrated scale readable therethrough:
   an acceleration-responsive mass-spring system mounted in said case and comprising a weighted resilient cantilever reed with its free end providing a main pointer deflectable along said scale; and
   at least one holding-pointer having a rotary frictional connection to pivot means and having a tip portion engageable by said main pointer,
   said holding-pointer having a tail portion extending beyond said pivot means and proportioned and weighted to balance it against linear acceleration,
   said pivot means comprising a shaft extending with sealing means through said case; and
   a reset knob on the outer end of said shaft;
   whereby said main pointer is adapted to push said holding pointer to a peak deflection against the friction of said frictional connection, said holding pointer retaining and recording said deflection until it is reset by said knob, and wherein:
   an equivalent pivot point of said reed lies approximately in a plane intermediate its length, and
   said pivot means of said holding pointers lie generally in the same plane.

2. An accelerometer as in claim 1, wherein:
   the plane of deflection of said holding pointer is spaced from the plane of deflection of said reed, and
   the end portion of said holding pointer has a reed-engaging element extending into that plane to be engaged by said main pointer.

3. An accelerometer as in claim 2, wherein:
   said reed-engaging element is a portion of said holding pointer bent into said plane,
   said holding pointer being made of sheet metal.

4. An accelerometer as in claim 3, wherein:
   a tip portion of said holding pointer is cut at an angle to match generally the angles of the index lines on said scale throughout the length of said scale.

5. The structure of claim 2, wherein said sealing means comprises an elastomeric O-ring around said shaft.

6. A peak-recording accelerometer as in claim 2, further comprising:
   a filling of a liquid damping medium in said case, and
   an expansion compensator for said filling comprising a body of closed-cell elastomeric material.

7. An accelerometer as in claim 1, further comprising: adjusting means on said shaft outside said case disposed to adjust the frictional torque presented by said frictional connection.

8. An accelerometer as in claim 7 wherein:
   said frictional connection comprises a frictional washer compressible against the surface of said holding pointer in response to tension in said shaft, and said adjusting means comprises a screw passing through a clearance hole in said knob into a tapped hole in the end of said shaft; and further comprising:

clamping means to clamp said knob on said shaft,
said screw providing adjustment of said tension and thereby said friction, and
said clamping means locking said adjustment.

* * * * *